United States Patent
Takashima et al.

(10) Patent No.: US 9,834,836 B2
(45) Date of Patent: Dec. 5, 2017

(54) ROLLING BODY, METHOD FOR PRODUCING ROLLING BODY, AND DYNAMIC FORCE TRANSMISSION DEVICE

(75) Inventors: Kazuhiko Takashima, Yokohama (JP); Toshikazu Nanbu, Yokohama (JP); Kazunori Sakata, Kitakyushu (JP); Kouji Tagomori, Kitakyushu (JP); Naoki Sugiyama, Kitakyushu (JP)

(73) Assignees: NISSAN MOTOR CO., LTD., Yokohama-shi (JP); FUJIKIKOSAN CORPORATION, Kitakyushu-shi (JP)

( * ) Notice: Subject to any disclaimer, the term of this patent is extended or adjusted under 35 U.S.C. 154(b) by 645 days.

(21) Appl. No.: 14/130,783

(22) PCT Filed: Jul. 4, 2012

(86) PCT No.: PCT/JP2012/067061
§ 371 (c)(1),
(2), (4) Date: Jan. 3, 2014

(87) PCT Pub. No.: WO2013/005764
PCT Pub. Date: Jan. 10, 2013

(65) Prior Publication Data
US 2014/0141932 A1    May 22, 2014

(30) Foreign Application Priority Data
Jul. 5, 2011   (JP) .................. 2011-149007

(51) Int. Cl.
*F16H 13/02*    (2006.01)
*C23C 4/12*    (2016.01)
(Continued)

(52) U.S. Cl.
CPC ............... *C23C 4/124* (2013.01); *C23C 4/06* (2013.01); *C23C 4/10* (2013.01); *C23C 4/129* (2016.01);
(Continued)

(58) Field of Classification Search
CPC .. F16H 13/02; C23C 4/06; C23C 4/10; C23C 4/124
(Continued)

(56) References Cited

U.S. PATENT DOCUMENTS

2007/0297705 A1* 12/2007 Hosoya ............... F16C 33/3818
384/462

FOREIGN PATENT DOCUMENTS

JP            4-361 A      1/1992
JP      2000-257687 A      9/2000
(Continued)

OTHER PUBLICATIONS

A. Tronche et al., "Frictional Behaviour against Steel of Aluminum Substrates Plasma-sprayed with Hard Coatings", *Materials Science and Engineering A.*, vol. 102 (1988), pp. 1-12.
(Continued)

*Primary Examiner* — William C Joyce
(74) *Attorney, Agent, or Firm* — Foley & Lardner LLP (57) ABSTRACT

A high durability roller, a manufacturing method thereof and a power transmission device with the high durability roller are provided. The roller for a power transmission device that comprises a plurality of rollers in contact with each other directly or with lubricant between them, includes: a metal base having a Young's modulus of 220 GPa or less; and a coating that is formed on a surface of the metal base, includes hard particles and a metal component composed of at least either simple metal or alloy, and has a Young's modulus of 250 GPa or more. The power transmission device includes the roller. The method of manufacturing the roller includes: forming the coating on the surface of the metal base by thermal spraying using a thermal spray material that comprises the hard particles and the metal component composed of at least either simple metal or alloy.

12 Claims, 9 Drawing Sheets

(51) Int. Cl.
- *C23C 4/06* (2016.01)
- *C23C 30/00* (2006.01)
- *C23C 4/10* (2016.01)
- *F16H 55/32* (2006.01)
- *C23C 4/129* (2016.01)

(52) U.S. Cl.
CPC ............. *C23C 30/00* (2013.01); *F16H 13/02* (2013.01); *F16H 55/32* (2013.01); *F16H 2055/325* (2013.01)

(58) Field of Classification Search
USPC ....................................................... 476/8, 73
See application file for complete search history.

(56) References Cited

FOREIGN PATENT DOCUMENTS

| | | |
|---|---|---|
| JP | 2000-282210 A | 10/2000 |
| JP | 2004-183075 A | 7/2004 |
| JP | 2005-248288 A | 9/2005 |
| JP | 2007-327632 * | 12/2007 |
| WO | WO 2006/080527 A1 | 8/2006 |

OTHER PUBLICATIONS

A. Verstak et al., "Activated Combustion HVAF Coatings for Protection against Wear and High Temperature Corrosion", Proceedings of the 2003 International Thermal Spray Conference, May 5, 2003-May 8, 2003, 559-565 pages.

B. Zha et al., "Structure and Property of WC-17Co Coatings Sprayed by HVO/AF", Proceedings of the 2003 International Thermal Spray Conference, May 5, 2003-May 8, 2003, Orlando, FL [US], pp. 837-839.

Extended European Search Report dated Mar. 4, 2015 in European Application No. 12807480.4, 11 pages.

P. Mazars et al., "Structures De Revetements De Carbure De Tungstene Obtenus Par Differents Procedes De Projection", Advances in Thermal Spraying proceedings of the Eleventh International Thermal Spraying Conference, Sep. 8-12, 1986, Montreal [CA], Sep. 8-12, 1986, pp. 111-120.

R.Ahmed et al., "Rolling contact fatigue behavior of thermally sprayed rolling elements", Surface and Coatings Technology, vol. 82, (1996), pp. 176-186.

S.L. Liu et al., "Influence of nano-WC-12Co powder addition in WC-10Co-4Cr AC-HVAF sprayed coatings on wear and erosion behavior", Wear, vol. 269, Apr. 30, 2010, pp. 362-367.

S.B. Liu et al., An Extension of the Hertz Theory for Three-Dimensional Coated Bodies, Tribology Letters, vol. 18, No. 3, Mar. 2005, pp. 303-314.

\* cited by examiner

ROLLING BODY, METHOD FOR PRODUCING ROLLING BODY, AND DYNAMIC FORCE TRANSMISSION DEVICE

TECHNICAL FIELD

The present invention relates to a roller, a method of manufacturing a roller and a power transmission device.

More specifically, the present invention relates to a high durability roller, a manufacturing method thereof and a power transmission device with the high durability roller.

BACKGROUND ART

Among conventional abrasion-resistant materials that are applicable to rollers in contact with each other under high contact pressure, one proposal that has been made is a material that contains 35 to 75 vol % of hard particles having an average particle size of 0.5 μm to 10 μm dispersed in a metal matrix, and has a surface hardness of 700 HV or more (see, Patent Literature 1).

Further, another proposal is a bearing with a hard coating of WC-12% Co alloy that is formed by high velocity flame thermal spraying (see Patent Literature 2).

CITATION LIST

Patent Literature

Patent Literature 1: JP 2004-183075A
Patent Literature 2: WO 2006/080527A

SUMMARY OF INVENTION

Technical Problem

However, since the abrasion-resistant material described in Patent Literature 1 is made of superhard alloy, the maximum contact stress Pmax applicable to such components is excessively large due to their considerable weight and high Young's modulus, which results in a problem of limited improvement in durability.

Further, while a certain level of improvement in durability has been achieved in the bearing described in Patent Literature 2, there is still a need for further improvement in durability.

The present invention was made in consideration of these problems in the art.

It is an object of the present invention to provide a high durability roller, a manufacturing method thereof and a power transmission device with the high durability roller.

Solution to Problem

The present inventors have made a diligent study to achieve the above object.

As a result, they found that the above object is achieved by forming a coating on the surface of a metal base having a Young's modulus of 220 GPa or less, wherein the coating includes hard particles and a metal component, such as simple metal or alloy, and has a Young's modulus of 250 GPa or more. The present invention was thus completed.

That is, the roller of the present invention is used for power transmission to devices that include a plurality of rollers in contact with each other directly or with lubricant between them.

Further, the roller includes a metal base having a Young's modulus of 220 GPa or less and a coating on the metal base that contains hard particles and a metal component composed of at least either simple metal or alloy and has a Young's modulus of 250 GPa or more.

Further, the manufacturing method of a roller of the present invention is a method of manufacturing the above-described roller of the present invention, and includes forming the coating on the metal base by thermal spraying using a predetermined thermal spray material.

The predetermined thermal spray material of the manufacturing method of the roller contains the hard particles and the metal component composed of at least either simple metal or alloy.

Further, the power transmission device of the present invention includes the above-described roller of the present invention.

Advantageous Effects of Invention

With the present invention, it becomes possible to provide the high durability roller, the manufacturing method thereof and the power transmission device with the high durability roller.

DESCRIPTION OF EMBODIMENTS

Hereinafter, the roller, manufacturing method of the roller and power transmission device of the present invention will be described in detail.

First, a roller according to an embodiment of the present invention will be described in detail with reference to the drawings.

Figure 1:
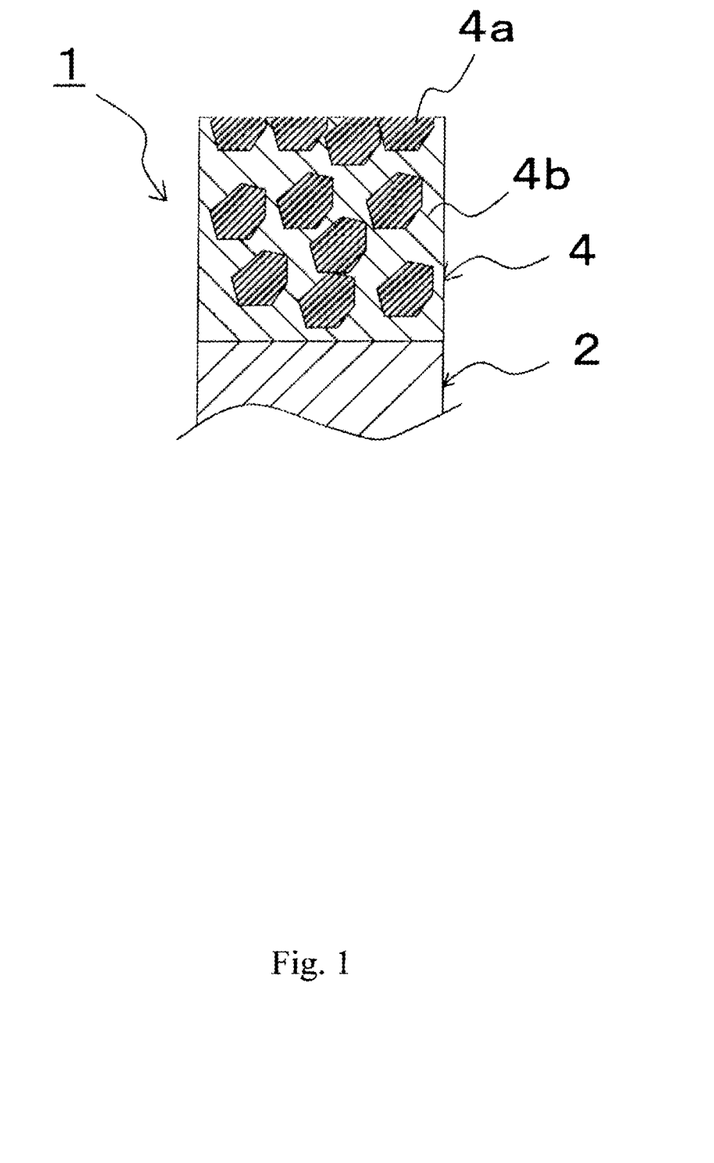
FIG. 1 is a schematic cross sectional view illustrating an exemplary coating structure of a roller according to an embodiment of the present invention.

FIG. 1 is a schematic cross sectional view illustrating an exemplary coating structure of the roller according to this embodiment.

As illustrated in FIG. 1, the roller 1 of this embodiment includes a metal base 2 and a coating 4 formed on the surface of the metal base 2.

The metal base 2 of the roller 1 has a Young's modulus of 220 GPa or less. The Young's modulus of the metal base is preferably 200 GPa or more. The coating 4 of the roller 1 contains hard particles 4a and a metal component 4b composed of at least simple metal or alloy, and has a Young's modulus of 250 GPa or more. A higher Young's modulus is better. Good results have been obtained so far when the Young's modulus of the coating is 262 GPa to 301 GPa.

With this structure, the roller exhibits high durability even under a contact pressure as high as 3.5 GPa, for example, and thus can be suitably used for traction drive power transmission devices, such as multi-speed transmissions and transfer cases of four-wheel drive vehicles, which have a clutch function imparted by the roller.

Further, this structure offers improved productivity compared to sintered bodies of superhard alloys, which results in an advantage of low cost production.

In this embodiment, the roller has an equivalent Young's modulus of preferably 350 GPa or less and 200 GPa or more. As of now, good results have been obtained in the range from 219 GPa to 281 GPa. For example, by using a metal base having a low Young's modulus and forming a thin coating thereon having a high Young's modulus, the equivalent Young's modulus can be reduced to a value lower than that of superhard alloys, which results in reduced Hertzian contact stress Pmax at the contact part of the roller. This allows for further improved durability of the roller.

Furthermore, in this embodiment, the coating preferably has a sectional porosity of preferably 5 vol % or less. The coating having a porosity of 5 vol % or less has fewer internal defects and improved mechanical strength, which results in further improved durability. The lower the porosity is the better, and porosity is ideally 0 vol %. Good results have been obtained thus far when the sectional porosity of the coating is 0.9 to 7.6 vol %.

Hereinafter, each component will be described in more detail.

(Metal Base 2)

The metal base 2 may be made of any material as long as its Young's modulus is 220 GPa or less, and preferably 200 GPa or more. The base materials of conventional rollers may be employed.

Examples of such metal bases include those made of JIS G4051 carbon steels for machine structural use (SC), JIS G4052 structural steels with specified hardenability bands (H steels), JIS G4053 alloyed steels for machine structural use (manganese steels (SMn), chromium-manganese steels (SMnC), chromium steels (SCr), chromium-molybdenum steels (SCM), nickel-chromium steels (SNC) and nickel-chromium-molybdenum steels (SNCM)), JIS G4401 carbon tool steels (SK), JIS G4403 high speed tool steels (SKH), JIS G4404 alloy tool steels (SKS, SKD, SKT) and JIS G4805 high carbon chromium bearing steels (SUJ), all of which conform to Japanese Industrial Standards (JIS).

Their typical hardness is approximately 700 to 800 HV, and their typical melting point is approximately 1400° C. to 1500° C.

(Hard Particles 4a)

It is preferred that the hard particles 4a have higher hardness than the metal base 2 and a higher melting point than the metal base 2, but the present invention is not limited thereto. As used herein, the term "hardness" may be defined as Vickers hardness (HV), for example, but it is not limited thereto and other scales may be used.

Such hard particles include, for example, hard particles of carbides, borates, nitrides, silicates, sulfides, oxides and carbon.

The above-listed hard particles generally have high hardness and a high melting point. It is advantageous that the use of such hard particles also imparts high resistance to seizing.

Further, they may be used alone or in a combination of two or more.

Examples of carbide hard particles include hard particles of titanium carbide (TiC), zirconium carbide (ZrC), vanadium carbide (VC), niobium carbide (NbC), tantalum carbide (TaC), chromium carbide ($Cr_3C_2$), molybdenum carbide ($Mo_2C$), tungsten carbide (WC), boron carbide ($B_4C$), silicon carbide (SiC) and the like.

Examples of borate hard particles include hard particles of titanium borate ($TiB_2$), zirconium borate ($ZrB_2$), vanadium borate ($VB_2$), niobium borate ($NbB_2$), tantalum borate ($TaB_2$), chromium borate ($CrB_2$), molybdenum borate ($Mo_2B_5$), tungsten borate ($W_2B_5$), boron (B), aluminum borate ($AlB_{12}$), silicon borate ($SiB_6$) and the like.

Examples of nitride hard particles include hard particle of titanium nitride (TiN), zirconium nitride (ZrN), vanadium nitride (VN), niobium nitride (NbN), chromium nitride (CrN), boron nitride (c-BN), silicon nitride ($Si_3N_4$), aluminum nitride (AlN) and the like.

Examples of oxide hard particles include hard particles of aluminum oxide ($Al_2O_3$), zirconium oxide ($ZrO_2$), titanium oxide ($TiO_2$), thorium oxide ($ThO_2$), beryllium oxide (BeO), magnesium oxide (MgO) and the like. It is preferred that magnesium oxide is contained in the form of, for example, magnesium zirconate.

Examples of carbon hard particles include hard particles of diamond (C) and the like.

Among them, tungsten carbide (WC, Vickers hardness of 2350 HV, melting point of 2776° C., density of 15.72 g/cm$^3$) is particularly preferred because of its high hardness, high melting point and high density.

The high density of tungsten carbide is advantageous in that thermal spraying (described below) more easily forms a less-porous dense coating.

(Metal Component 4b)

The metal component 4b may be, for example, simple metal or alloy, but is not limited thereto. The metal component serves as a binder that firmly binds hard particles with each other. Therefore, the metal component may also be, for example, an intermetallic compound or solid solution as long as it has such a function.

These materials may be used alone or in combination of two or more.

Examples of such simple metals include cobalt (Co), iron (Fe), nickel (Ni), chromium (Cr), titanium (Ti) and the like.

Examples of such alloys include cobalt (Co)-chromium (Cr), nickel (Ni)-chromium (Cr), hastelloy, chromium (Cr)-molybdenum (Mo), tungsten (W)-chromium (Cr), nickel (Ni)-cobalt (Co)-chromium (Cr), tungsten (W)-cobalt (Co), nickel (Ni)-chromium (Cr)-aluminum (Al), nickel (Ni)-molybdenum (Mo) and the like.

Among them, the use of cobalt (Co) is preferred.

Cobalt (Co) easily forms a dense coating because of its high plastic deformability.

As for the other components, the coating may include an η phase, for example, which is produced when the coating is formed by thermal spraying (described below) using tungsten carbide as the hard particles.

The η phase is also referred to as a lower carbide.

If the coating is formed by thermal spraying (described below) using tungsten carbide as the hard particle component of the thermal spray material, the tungsten carbide is eluted into the simple metal or alloy of the metal component, which is the other component of the thermal spray material.

In this case, if cobalt (Co) is used as the metal component, the η phase of double carbide, such as $W_3Co_3C$, is produced in addition to tungsten carbide (WC, $W_2C$), for example.

The η phase typically has higher hardness and a higher melting point compared to simple metals and alloys.

Therefore, inclusion of the η phase results in further improved durability of the roller.

Next, a method of manufacturing a roller according to an embodiment of the present invention will be described in detail.

The manufacturing method of a roller of this embodiment is an exemplary method of manufacturing the above-described roller according to the other embodiment of the present invention.

Specifically, the manufacture of the roller involves forming the coating on the base by thermal spraying using a thermal spray material that includes, for example, at least one type of hard particles having higher hardness and a higher melting point than those of the base, and a metal component composed of at least either simple metal or alloy.

With this manufacturing method, the particle size of the thermal spray material sprayed on the base surface is in the range from several μm to tens of which allows for selective coating on necessary areas at a high coating rate.

Further, this manufacturing method permits a high content of hard particles in the thermal spray material, and it allows for selective coating on necessary areas, which has an advantage of low-cost manufacture of the roller.

The preferred thermal spraying method is, for example, atmospheric thermal spraying.

If the coating can be formed in the air, the method can be easily applied to the manufacture of large rollers.

It is understood that the thermal spraying may be carried out also under a controlled atmosphere.

Furthermore, the preferred thermal spraying method is, for example, high velocity flame thermal spraying. High velocity flame thermal spraying is classified into HVOF (high velocity oxy-fuel), which uses oxygen as the combustion support gas, and HVAF (high velocity air fuel), which uses air as the combustion support gas. In HVOF, most of the combustion support gas is utilized for gas combustion, which results in a high gas combustion temperature. In contrast, in HVAF, the combustion support gas is air, and can be used to cool down the combustion gas, thereby allowing a lower combustion gas temperature, as it is made up of 80% non-oxygen components, which are not utilized for combustion. Since high combustion temperatures tend to cause adhesion of the thermal spray material to the inside of a nozzle, it is difficult to increase the particle velocity in an HVOF system using a Laval nozzle, which has a function of increasing the particle velocity. In contrast, an HVAF system can use a Laval nozzle because of its low combustion temperature. Even without a Laval nozzle, the large amount of non-oxygen components in the combustion support gas that is not utilized in the combustion flows through a nozzle to serve as carrier gas for the thermal spray material. In this way, it is possible to increase the particle velocity compared to an HVOF system. The use of HVAF is preferred since high particle velocity is an important factor in forming a high quality coating, which is described in detail in a later section.

Also in HVOF, air or nitrogen gas may be additionally introduced into a combustion chamber or at a later stage after the combustion chamber in order to cool down the combustion gas or to increase the amount of carrier gas. Alternatively, although it is uneconomical, the combustion support gas of HVOF, i.e. oxygen, may be oversupplied in an amount more than needed for combustion.

By forming the coating using high velocity flame thermal spraying, it becomes easier to allow the hard particles to be eluted into the simple metal or alloy.

As a result, it becomes easier to produce the 11 phase in the coating so as to improve the hardness and melting point of the coating, which results in further to enhanced durability and resistance to seizing of the roller.

It is preferred that the thermal spray material is granulated material made from, for example, the above-described hard particles and particles containing the above-described metal component.

The use of the granulated thermal spray material made from the hard particles and the metal component particles provides high flexibility of the composition of the thermal spray material, and thus allows for any combination of the components as long as fine primary particles can be prepared.

Next, a power transmission device according to an embodiment of the present invention will be described with reference to the drawings.

Figure 2:
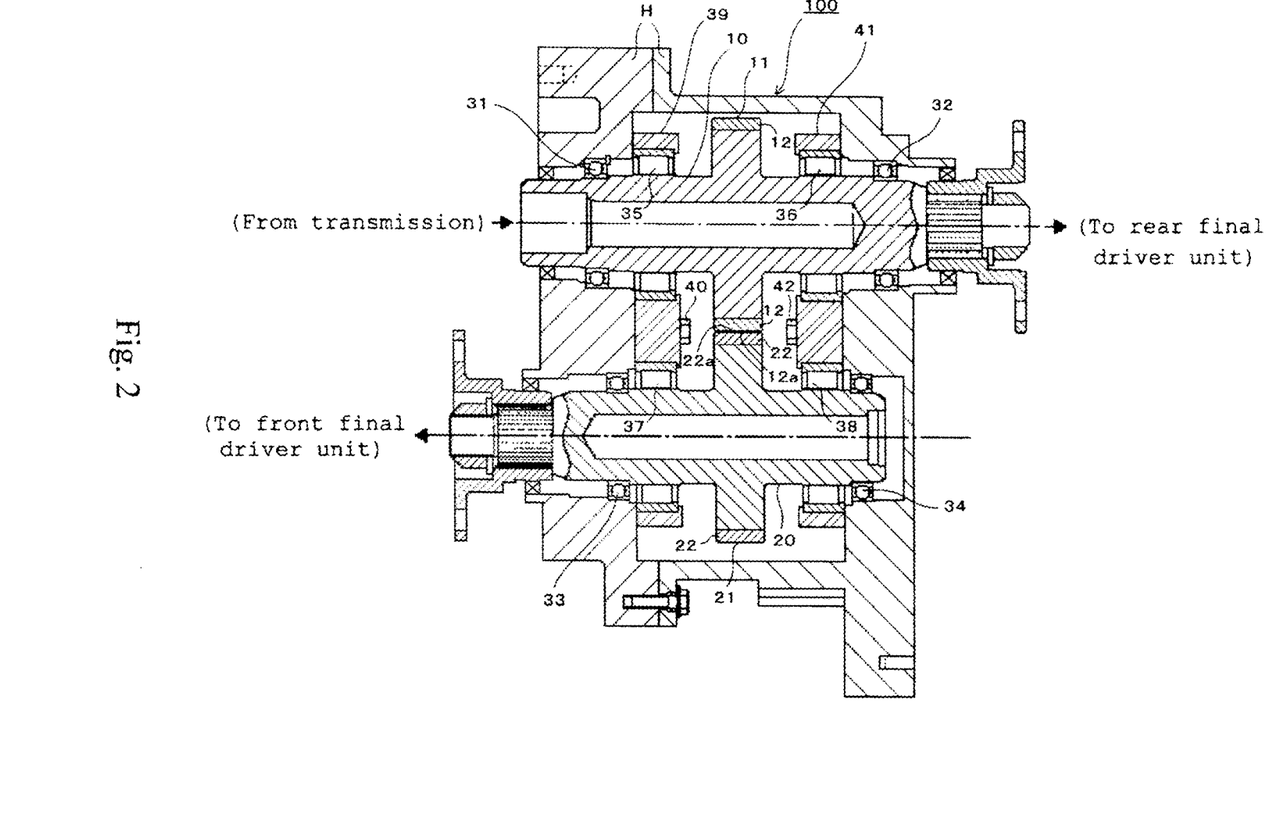
FIG. 2 is a cross sectional view illustrating an exemplary power transmission device according to an embodiment of the present invention.

FIG. 2 is a cross sectional view of a transfer case of a four-wheel drive vehicle, which is an exemplary power transmission device according to the embodiment of the present invention.

The transfer case 100 of a four-wheel drive vehicle, which is an example of the power transmission device, includes an input shaft 10 and an output shaft 20 placed in a housing H, which are an example of the roller.

The input shaft 10 is rotatably supported by ball bearings 31 and 32 relative to the housing H. Similarly, the output shaft 20 is rotatably supported by ball bearings 33 and 34 relative to the housing H.

The input shaft 10 is further rotatably supported relative to the housing H by roller bearings 35 and 36 that are placed inside the housing H, and the output shaft 20 is further rotatably supported relative to the housing H by roller bearings 37 and 38 that are placed inside the housing H.

Accordingly, the roller bearings 35 and 37 are positioned on the same plane perpendicular to the input and output shafts 10 and 20, and are held in the same bearing support 39. The bearing support 39 is attached on the corresponding inner face of the housing H by arbitrary means, such as a bolt 40.

Also, the roller bearings 36 and 38 are positioned on the same plane perpendicular to the input and output shafts 10 and 20, and are held in the same bearing support 41. The bearing support 41 is attached on the corresponding inner face of the housing H by arbitrary means, such as a bolt 42.

Both ends of the input shaft 10 protrude from the housing H, wherein the left end of the input shaft 10 in the figure is connected to an output shaft of a transmission (not shown), and the right end of the input shaft 10 is connected to a rear final driver unit (not shown) through a rear propeller shaft (not shown).

The left end of the output shaft 20 in the figure protrudes from the housing H, wherein the protruded left end of the output shaft 20 is connected to a front final driver unit (not shown) through a front propeller shaft (not shown).

The input shaft 10 is made of bearing steel (SUJ), and includes a first roller 11 made of bearing steel (SUJ) in the middle along the axial direction. On the surface of the first roller 11, a WC—Co coating 12 is formed by high velocity flame thermal spraying.

Also, the output shaft 20 is made of bearing steel (SUJ), and includes a second roller 21 made of bearing steel (SUJ) in the middle along the axial direction. On the surface of the second roller 21, a WC—Co coating 22 is formed by high velocity flame thermal spraying.

They are placed such that the first roller 11 and the second roller 21 are positioned on the same plane perpendicular to the axes.

The first roller 11 and the second roller 21 are pressed against each other in the radial direction so that the coatings on the circumferential faces of the rollers abut each other at portions denoted by the reference signs 12a and 22a under a predetermined pressure.

That is, the bearing supports 39 and 41 define the interaxial distance between the first roller 11 and the second roller 21 as being shorter than the sum of the radius of the first roller 11 and the radius of the second roller 21, so as to generate radial pressing force between the first roller 11 and the second roller 21.

This radial pressing force determines the torque that can be transmitted between the first roller 11 and the second roller 21.

In FIG. 2, the coatings 12 and 22 are formed on both the first roller 11 and the second roller 21, but the coating may be formed on only either one of them as long as the durability requirement is satisfied (not shown).

If the rear wheels are on a slippery road and the front wheels are on a less slippery road, for example, the transfer case 100 is driven such that the input shaft 10 rotates while the output shaft 20 does not rotate.

Then, to run the vehicle, the first roller 11 of the input shaft 10 and the second roller 21 of the output shaft 20 are pressed against each other to transmit the driving force to the output shaft 20.

At this moment, since the output shaft 20 does not rotate, it receives the driving force at high sliding velocity by being pressed.

Also, the transfer case with the rollers of the present invention has high durability due to the application of the predetermined coating. Furthermore, it has another advantage of sufficiently transmitting the driving force while suppressing or preventing seizing.

The rollers of the first roller 11 and second roller 21 may be in contact with each other either directly or with lubricant between them (not shown). A typical lubricant that can be used is traction oil (KTF-1).

EXAMPLES

Hereinafter, the present invention will be described in more detail with inventive and comparative examples, but the present invention is not intended to be limited to those inventive examples.

Inventive Example 1-1

A metal base of bearing steel (SUJ2) (Young's modulus of 208 GPa, Poisson's ratio of 0.3, surface hardness of 700 to 750 HV, cylindrical shape (70 mm in outer diameter $\phi$, 18 mm in width)) was prepared, and the surface thereof was blasted with aluminum oxide particles.

Then, a coating was formed on the surface of the base by high velocity flame thermal spraying in the conditions listed in table 1 using a thermal spray material (composition of WC-12 wt % Co) that is granulated material made from tungsten carbide (WC), an example of the hard particles, and cobalt (Co), an example of the metal component particles.

An HVAF device, which uses air as combustion support gas, was used for the high velocity flame thermal spraying. In this inventive example, a Laval nozzle was used in order to increase the particle velocity of the thermal spraying.

The particle velocity was measured at the thermal spray distance (from the nozzle tip to the base) by a visualized image velocimeter (PIV, particle image velocimetry). Since it is difficult to measure the particle velocity at the time of collision with the base, the flight velocity of the particles was measured at the thermal spray distance from the nozzle tip while the nozzle is not mounted to the base.

Then, the surface of the coating was grinded by a diamond wheel, and then lapped with a diamond abrasive grain so that the surface roughness Ra became 0.04 µm or less. A test roller of the inventive example (roller for the roller pitching test) was thus obtained.

(Young's Modulus of Coating)

After the durability test described below, a test piece was prepared by cutting the test roller of this inventive example (roller for the roller pitching test).

Data was then obtained by fixing the prepared test piece on a stage of a microindenter (Nano Indenter XP from MTS Systems) and performing a continuous stiffness measurement five times using an indenter (Berkovich, triangular pyramid).

The obtained data was analyzed under analytical conditions for calculating Young's modulus at a contact depth of approximately 800 nm. The Young's modulus was thus measured.

(Equivalent Young's Modulus of Roller)

The equivalent Young's modulus (E*) of the roller was calculated from the Young's modulus and Poisson's ratio of the base and the Young's modulus and Poisson's ratio of the coating according to the following equation (1). The Poisson's ratio of the coating was set to 0.3. The parameter, coefficient 1 and coefficient 2 of the following equation (1) can be calculated by curve fitting with plotted $\alpha$, E and H, because $\alpha$, E and H have a constant relationship with each other.

$$E_2^* = E_{2c}^* \frac{1 - (\lambda + \kappa + 4\kappa\alpha^2 H^2)\exp(-2\alpha H) + \lambda\kappa\exp(-4\alpha H)}{1 + 4\alpha H\kappa\exp(-2\alpha H) - \lambda\kappa\exp(-4\alpha H)} \quad (1)$$

In the equation, $E_2^*$ is the equivalent Young's modulus of a roller, $E_{2c}^*$ is the Young's modulus of a coating, $\alpha$ is a parameter, $H$ ($=h/a_{0s}$) is the dimensionless coating thickness, h is the coating thickness, $a_{0s}$ is the contact radius, $\kappa$ is coefficient 1, and $\lambda$ is coefficient 2.

(Sectional Porosity of Coating)

After the durability test described below, a test piece was prepared by cutting the test roller of the inventive example (roller for the roller pitching test). Then, a cross section of the prepared test piece was observed under an optical microscope (objective lens 50×) to capture an image in an image processor. The image was then binarized to extract pores, i.e. measuring objects, as black areas.

Then, the area proportion of the observed black areas was calculated using an image processor (Axio Vision from Carl Zeiss) so as to obtain the sectional porosity of the coating.

The specifications of this inventive example is also shown in part in table 1.

Inventive Examples 1-2 Through 1-5

Test rollers (rollers for the roller pitching test) of inventive examples were prepared using the same process as inventive example 1-1, except that the specifications of the hard particles, the thermal spray conditions and the like were changed to those listed in table 1 so as to change the Young's modulus and the like of the coating.

Specifically, the coating of inventive example 1-2 was formed by an HVAF device with a Laval nozzle as with inventive example 1-1. Meanwhile, the coatings of inventive examples 1-3 through 1-5 were also formed by an HVAF device, which uses air as combustion support gas, but with a straight nozzle instead of a Laval nozzle.

The Young's modulus of the coatings, the equivalent Young's modulus of the rollers and the sectional porosity of the coating were measured or calculated in the same manner as described above.

A part of the specifications of each inventive example is also shown in table 1.

Comparative Example 1-1

A test roller (roller for the roller pitching test) of the comparative example was prepared in the same manner as inventive example 1-1, except that the specifications of the hard particles, the thermal spray conditions and the like were changed to those listed in table 1 so as to change the Young's modulus and the like of the coating.

A typical HVOF device, which uses oxygen as combustion support gas, was used for the high velocity flame thermal spraying.

The Young's modulus of the coating and the sectional porosity of the coating were measured or calculated in the same manner as described above.

A part of the specifications of this comparative example is also shown in table 1.

Figure 3:
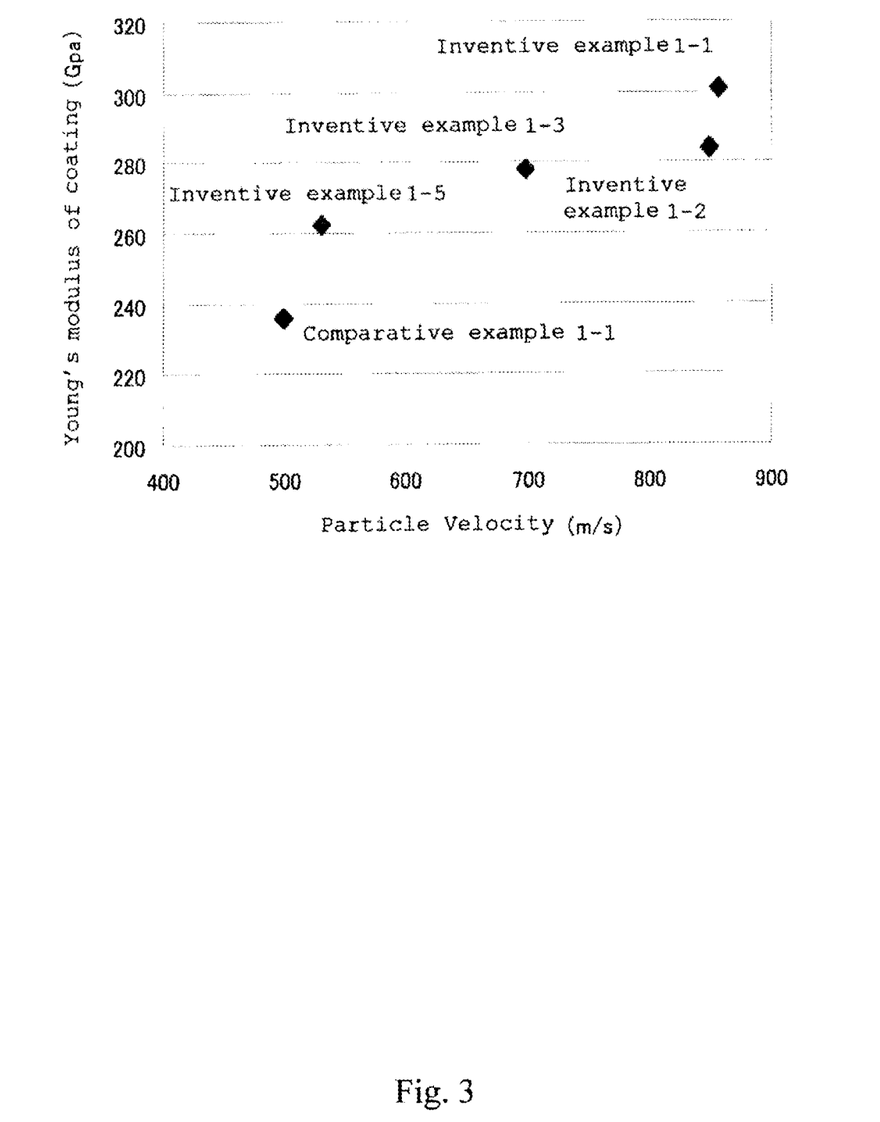
FIG. 3 is a graph showing the relationship between the particle velocity and the Young's modulus of each example.

FIG. 3 shows a part of the relationship between the particle velocity and the Young's modulus of the coatings of the above-described inventive examples 1-1 thorough 1-5 and comparative example 1-1. Since higher particle velocity results in a higher Young's modulus, typical high velocity flame thermal spraying using a HVOF device cannot produce a coating having a Young's modulus over 250 GPa. Therefore, in order to manufacture the high durability roller, it is preferred to use an HVAF device, which uses air as combustion support gas.

Inventive Example 2-1

A test roller (roller for the roller pitching test) of this inventive example was prepared in the same manner as the inventive example 1-1, except that the thickness of the coating was changed to 100 µm.

The Young's modulus of the coating, the equivalent Young's modulus of the roller and the sectional porosity of the coating were measured or calculated in the same manner as described above.

In this example, the Young's modulus of the coating was 301 GPa, the equivalent Young's modulus of the roller was 219 GPa, and the sectional porosity of the coating was 0.9 vol %.

Comparative Example 2-1

A test roller (test roller for the roller pitching test) of this comparative example was prepared using a typical superhard alloy (Young's modulus of 364 GPa).

The test roller of this comparative example was not provided with a coating but was a bulk body of the superhard alloy. Accordingly, the equivalent Young's modulus of the roller was the same as the Youngs's modulus of the superhard alloy itself (364 GPa).

TABLE 1

| | Primary Particle Size of Hard particles (µm) | Particle Size (µm) | Thermal Spraying Conditions | | | | | |
|---|---|---|---|---|---|---|---|---|
| | | | Type of Thermal Spraying | Type of Combustion Gas | Primary Combustion Pressure (psi)* | Secondary Combustion Pressure (psi)* | Compressed Air Pressure (psi)* | Thermal Spray Distance (mm) | Coating Thickness (µm) |
| Inventive Example 1-1 | 1.5 | −30 + 5 | High Velocity Flame Thermal Spraying (HVAF) | Propylene | 100 | 110 | 108 | 300 | 500 |
| Inventive Example 1-2 | 0.7 | −30 + 5 | High Velocity Flame Thermal Spraying (HVAF) | Propylene | 100 | 110 | 108 | 300 | 500 |
| Inventive Example 1-3 | 1.5 | −30 + 5 | High Velocity Flame Thermal Spraying (HVAF) | Propylene | 80 | 60 | 85 | 150 | 500 |
| Inventive Example 1-4 | 0.2 | −30 + 5 | High Velocity Flame Thermal Spraying (HVAF) | Propylene | 80 | 60 | 85 | 150 | 500 |
| Inventive Example 1-5 | 1.5 | −45 + 10 | High Velocity Flame Thermal Spraying (HVAF) | Propylene | 80 | 60 | 85 | 150 | 500 |
| Comparative Example 1-1 | 1.5 | −45 + 10 | High Velocity Flame Thermal Spraying (HVOF) | | See Below** | | | 300 | 500 |

| | Young's Modulus of Coating (GPa) | Equivalent Young's Modulus of Roller (GPa) | Sectional Porosity of Coating (vol %) | Life time (Times) |
|---|---|---|---|---|
| Inventive Example 1-1 | 301 | 281 | 0.9 | $2.76 \times 10^7$ |
| Inventive Example 1-2 | 284 | — | 1.4 | $2.13 \times 10^7$ |
| Inventive Example 1-3 | 278 | 264 | 1.0 | $2.46 \times 10^6$ |
| Inventive Example 1-4 | 273 | — | 3.1 | $1.33 \times 10^5$ |
| Inventive Example 1-5 | 262 | — | 7.6 | $2.89 \times 10^4$ |
| Comparative Example 1-1 | 236 | — | 3.1 | $1.17 \times 10^4$ |

*1 psi = 6.895 kPa
230 psi of oxygen, 130 psi of kerosene, 140 slm* of nitrogen
***Flow rate by liter per minute at 1 atm and 0° C.
HVAF: High Velocity Air Fuel
HVOF: High Velocity Oxy-Fuel (Performance Evaluation)
(Durability Evaluation Test)

Figure 4:
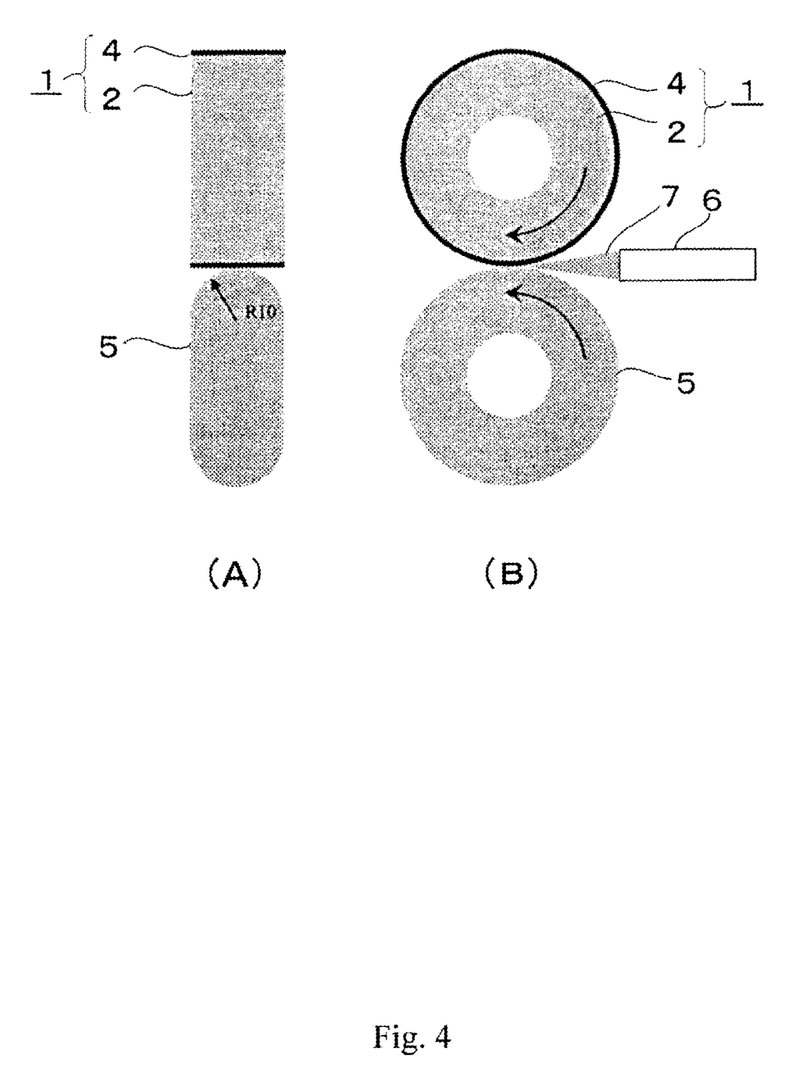
FIGS. 4(A) and 4(B) are a plan view and a side view illustrating the process of a durability test.

FIGS. 4(A) and 4(B) are a plan view and a side view illustrating the process of a durability evaluation test (roller pitching test).

As illustrated in the figures, the flat-face test roller 1 for the roller pitching test of each example was placed in contact with the circumferential face of a roller 5 having an R10 shape and made of die steel (Young's modulus of 213 GPa, Poisson's ratio of 0.28, surface hardness of 700 to 750 HV). Then, in the conditions listed in table 2, the roller 1 and the roller 5 were rotated while feeding lubricant (traction oil) 7 from a lubricant feeder 6, and the number of rotations was counted until the roller 1 stopped due to vibration of the roller 1 caused by pitching. The durability of the roller 1 was evaluated with this number.

The results are also shown in Table 1.

TABLE 2

| | |
|---|---|
| Rotation of Roller 5 | 3000 min$^{-1}$ |
| Slide to Roll Ratio of Roller 1 on Circumferential Face of Roller 5 | −0.5% |
| Lubricant Fed to Contact Area | Traction Oil (3 L/min, 90° C.) |
| Contact Lord between Roller 5 and Roller 1 | 2.86 kN |

As shown in table 1, inventive examples 1-1 through 1-5, which fall within the scope of the present invention, had a longer life time (number of times), i.e. higher durability, compared to comparative example 1-1, which is out of the scope of the present invention.

Figure 5:
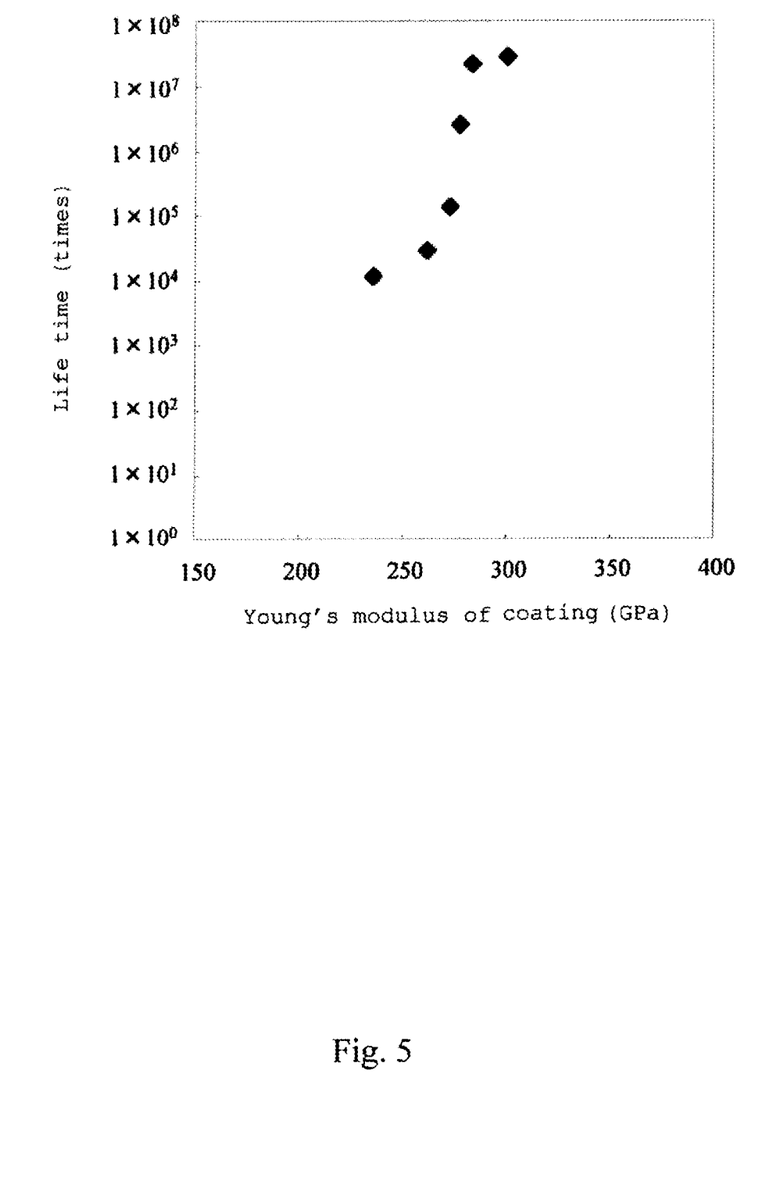
FIG. 5 is a graph showing the relationship between the Young's modulus of coatings and the life time.

FIG. 5 is a graph showing the relationship between the Young's modulus of the coatings and the life time of inventive examples 1-1 through 1-5 and comparative example 1-1.

As shown in FIG. 5, the life time increases beyond 236 GPa. In particular, the life time is greatly improved when the Young's modulus of the coating is 250 GPa or more.

Figure 6:
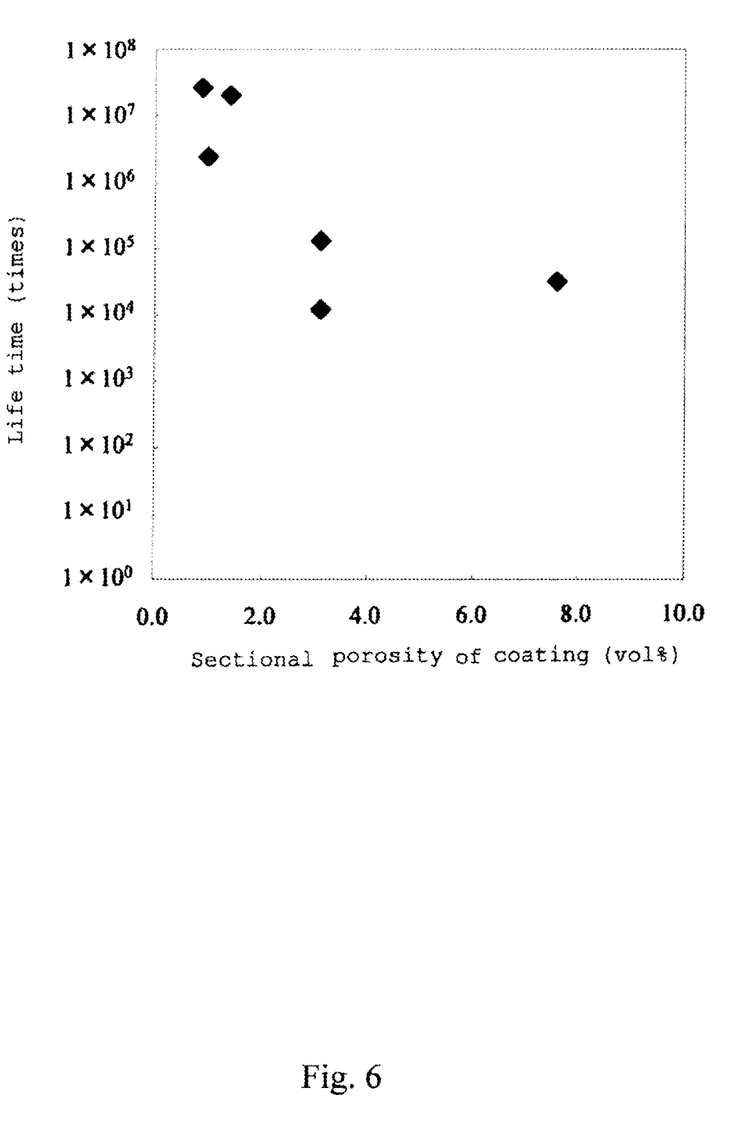
FIG. 6 is a graph showing the relationship between the sectional porosity of coatings and the life time.

FIG. 6 is a graph showing the relationship between the sectional porosity of the coatings and the life time of inventive examples 1-1 through 1-5 and comparative example 1-1.

As shown in FIG. 6, lower porosity is likely to result in a longer life time. This is particularly noticeable when porosity is at 5 vol % or less.

Next, the relationship between the equivalent Young's modulus and the life time of the rollers was examined.

Figure 7:
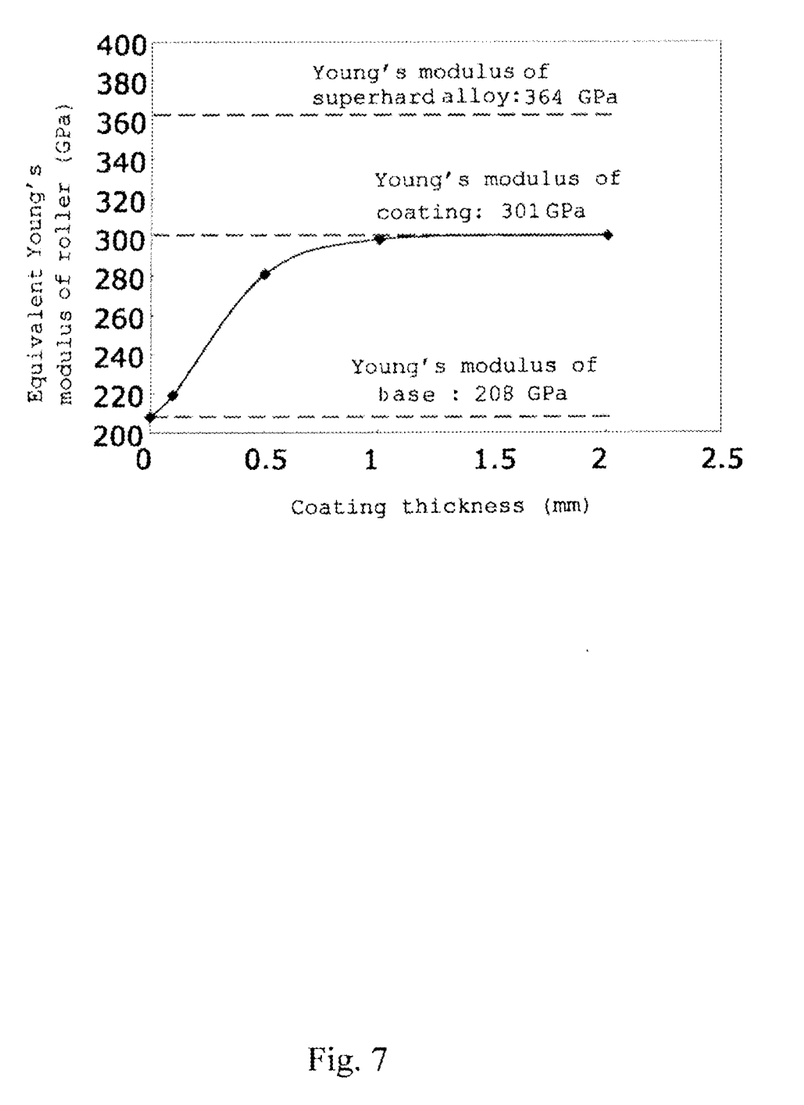
FIG. 7 is a graph showing the relationship between the coating thickness and the equivalent Young's modulus of rollers.

FIG. 7 is a graph showing the relationship between the coating thickness and the equivalent Young's modulus of the rollers of inventive examples 1-1 and 2-1.

As shown in FIG. 7, inventive example 1-1, which had the longest life time at 500 μm of inventive examples 1-1 to 1-5, exhibited an equivalent Young's modulus of 281 GPa. In contrast, inventive example 2-1, which is the counterpart example thereof having a coating thickness of 100 μm, exhibited an equivalent Young's modulus of 219 GPa.

Figure 8:
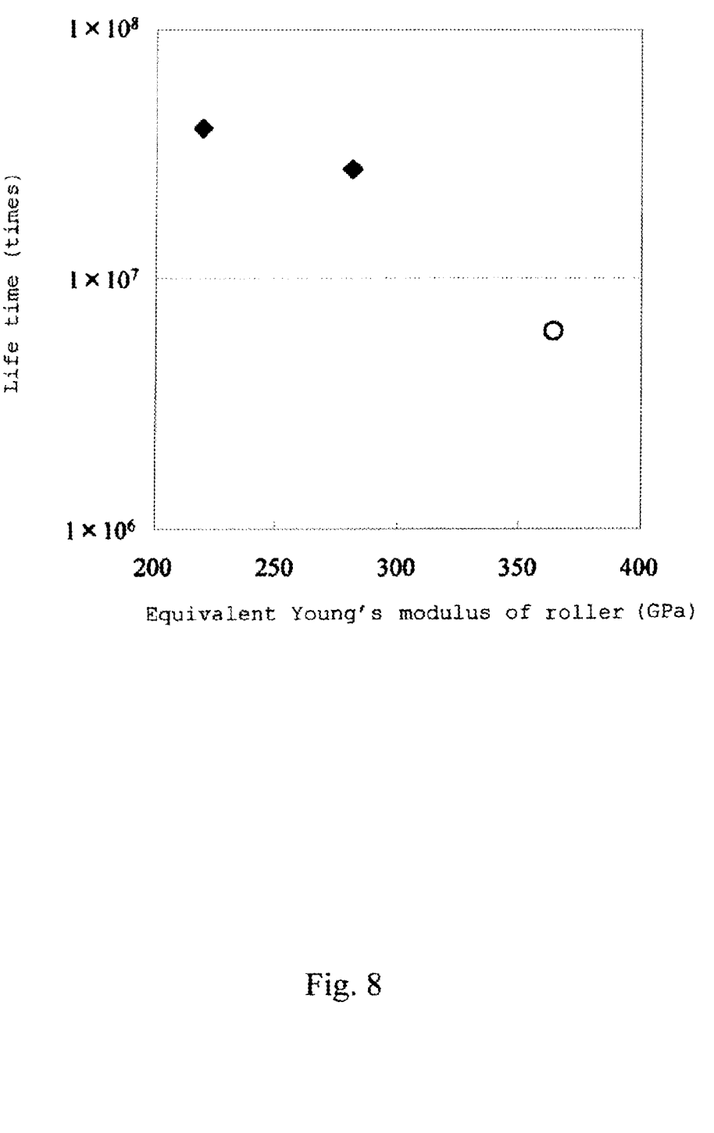
FIG. 8 is a graph showing the relationship between the equivalent Young's modulus of rollers and the life time.

FIG. 8 is a graph showing the relationship between the equivalent Young's modulus and the life time of the rollers of inventive examples 1-1 and 2-1 and comparative example 2-1.

As shown in FIG. 8, the life time increases when Young's modulus is 350 GPa or less, i.e. not more than the equivalent Young's modulus of superhard alloys.

Further, the coating can be formed exclusively on a necessary part of the metal base (roller portion), which has an advantage of very low-cost manufacture at high productivity in comparison to components of superhard alloys.

Figure 9:
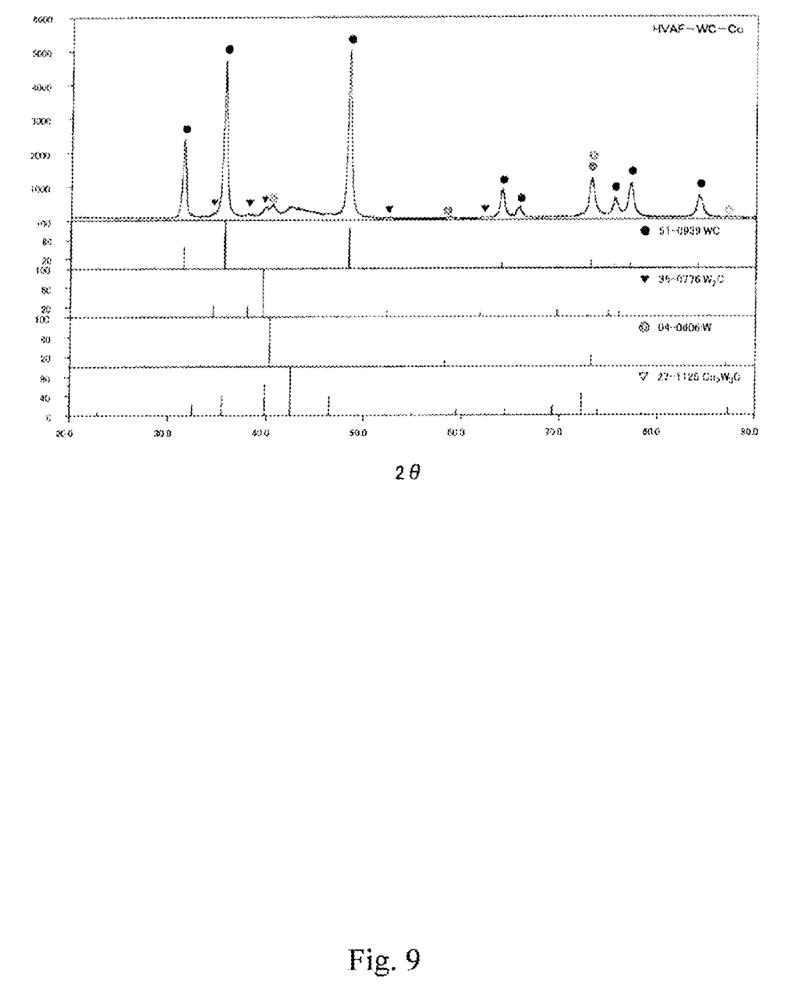
FIG. 9 is a graph showing the results of an X-ray diffraction analysis of a coating of inventive example 1-1.

FIG. 9 shows the result of the X-ray diffraction analysis of the coating of inventive example 1-1.

FIG. 9 shows that, due to the heated WC—Co particles in the high velocity flame thermal spraying, tungsten carbide (WC, $W_2C$) and the η phase ($Co_3W_3C$) are present in the coating (similar results were obtained in the analyses of the other examples).

It can be presumed that the inclusion of tungsten carbide as well as the η phase imparts the high durability.

It is assumed the advantageous effects of the present invention are obtained by the use of at least the above-listed hard particles that have higher hardness and a higher melting point than the metal base.

As described in the section regarding the manufacturing method of the inventive example of the roller that falls within the scope of the present invention, since the particle size of the thermal spray material sprayed on the base surface is several μm to tens of μm, the coating can be exclusively formed on necessary areas at a high coating rate.

Further, as described in the section regarding the manufacturing method of the inventive example of the roller that falls within the scope of the present invention, if the coating can be formed in the air, the method can be easily applied to the manufacture of large rollers.

Further, as described in the section regarding the manufacturing method of the inventive example of the roller that falls within the scope of the present invention, by forming the coating by high velocity flame thermal spraying, it becomes easier to allow the hard particles to be eluted into the simple metal or alloy so as to produce the η phase in the coating.

This improves the hardness and melting point of the coating, which results in further enhanced durability and resistance to seizing of the roller.

Further, as described in the section regarding the manufacturing method of the inventive example of the roller that falls within the scope of the present invention, the use of the granulated thermal spray material made from the hard particles and the metal component particles provides high flexibility in the composition of the thermal spray material.

Then, this allows for any combination of the components as long as fine primary particles of 1.5 μm or less can be prepared.

While the present invention is described with some embodiments and examples, the present invention is not intended to be limited thereto, and various modifications can be made within the gist of the present invention.

For example, the present invention is applicable to traction rollers, rolling rollers, guide rollers, roller bearings and the like.

REFERENCE SIGNS LIST

1 roller (roller for roller pitching test)
2 base
4 coating
4a hard particle
4b metal component
5 roller
6 lubricant feeder
7 lubricant
10 input shaft
11 first roller
12, 22 coating
20 output shaft
21 second roller
31, 32, 33, 34 ball bearing

35, 36, 37, 38 roller bearing
39, 41 bearing support
40, 42 bolt
100 transfer case of four-wheel drive vehicle
H housing

The invention claimed is:

1. A roller for a power transmission device that comprises a plurality of rollers in contact with each other directly or with lubricant between them, comprising:
   a metal base having a Young's modulus of 220 GPa or less; and
   a coating that is formed on a surface of the metal base, comprises hard particles and a metal component comprising at least either simple metal or alloy, and has a Young's modulus of 250 GPa or more, and
   the roller has an equivalent Young's modulus, as determined after the coating is formed on the metal base, of 200 GPa or more and 350 GPa or less, wherein the equivalent Young's modulus is determined according to the following equation (1):

$$E_2^* = E_{2c}^* \frac{1 - (\lambda + \kappa + 4\kappa\alpha^2 H^2)\exp(-2\alpha H) + \lambda\kappa\exp(-4\alpha H)}{1 + 4\alpha H\kappa\exp(-2\alpha H) - \lambda\kappa\exp(-4\alpha H)} \quad (1)$$

wherein in the equation (1), $E_2^*$ is the equivalent Young's modulus of the roller, $E_{2c}^*$ is the Young's modulus of the coating, H ($=h/a_{0s}$) is the dimensionless coating thickness, h is the coating thickness, $a_{0s}$ is the contact radius, wherein
$\alpha = wh/H$, $\kappa = (\mu-1)/(\mu+(3-4v_c))$, and $\lambda = 1-(4(1-v_c))/(1+\mu(3-4v_s))$, wherein $\mu$ is the shear modulus ratio, and each of $v_c$ and $v_s$ is Poisson's ratio.

2. The roller according to claim 1, wherein the coating has a sectional porosity of 5 vol % or less.

3. The roller according to claim 1, wherein the hard particles are hard particles of at least one selected from a group consisting of carbides, borates, nitrides, silicates, sulfides, oxides and carbon.

4. The roller according to claim 1, wherein the hard particles are hard particles of tungsten carbide.

5. The roller according to claim 4, wherein the coating comprises a η phase.

6. A power transmission device, comprising the roller according to claim 1.

7. A method of manufacturing the roller according to claim 1, comprising:
   forming the coating on the surface of the metal base by thermal spraying using a thermal spray material that comprises the hard particles and the metal component composed of at least either simple metal or alloy.

8. The method of manufacturing the roller according to claim 7, wherein the thermal spraying is atmospheric thermal spraying.

9. The method of manufacturing the roller according to claim 7, wherein the thermal spraying is high velocity flame thermal spraying.

10. The method of manufacturing the roller according to claim 7, wherein the thermal spray material is granulated material made from the hard particles and particles comprising the metal component.

11. The roller according to claim 1, wherein the roller has the equivalent Young's modulus of 219 GPa to 281 GPa.

12. The roller according to claim 1, wherein the hard particles and the metal component are present on a surface of the coating.

* * * * *